United States Patent [19]

Honda et al.

[11] Patent Number: 4,987,672
[45] Date of Patent: Jan. 29, 1991

[54] METHOD OF PARTITIONING THE INTERNAL SPACE OF A HOLLOW CYLINDRICAL MEMBER

[75] Inventors: Shuniti Honda; Toshimitsu Shida, both of Fujisawa, Japan

[73] Assignee: Fuji Valve Co., Ltd., Tokyo, Japan

[21] Appl. No.: 386,273

[22] Filed: Jul. 28, 1989

[51] Int. Cl.⁵ .......................................... B21D 39/00
[52] U.S. Cl. ................................... 29/509; 29/522.1; 29/888.06
[58] Field of Search ...................... 29/509, 512, 522.1, 29/523, 888.06, 888.061; 277/1; 123/90.52, 90.55, 90.56, 90.57, 90.58, 90.59

[56] References Cited

U.S. PATENT DOCUMENTS 4,477,714 10/1984 Zorn et al. .......................... 219/149

Primary Examiner—Joseph M. Gorski
Assistant Examiner—S. Thomas Hughes
Attorney, Agent, or Firm—Cushman, Darby & Cushman

[57] ABSTRACT

The present invention relates to a method of partitioning the internal space of a thin-walled cylindrical member by securing a thin-walled partition member in place within the cylindrical member by means of calking.

The method of the invention comprises the steps of: inserting a circular partition member into the hollow cylindrical member, the partititon member having a circular plate portion and a rim portion axially extending from one side of the periphery of the circular plate portion, the hollow cylindrical member being formed therein with a space portion of larger diameter and a space portion of smaller diameter, the portion of larger diameter being formed at its end adjacent to the portion of smaller diameter with an annular groove; placing the partitition member on a shoulder face formed between the two space portions so that the circular plate portion comes in contact with the shoulder face; and applying an axial force to the end face of the rim portion of the partition member to cause the rim portion to deform so that a portion of the rim portion penetrates into the annular groove, the partition member being thereby tightly secured by means of calking to the annular groove and consequently to the hollow cylindrical member.

Accordingly, the rim portion of the partition member can be tightly secured in place within the cylindrical member without applying a substantial radial force to the wall of the cylindrical member and, accordingly, the cylindrical member, particularly the outer surface thereof, will be subject to little deformation during the securing process of the partition member. Therefore, in case that the cylindrical member serves as a piston which has to be slidably mounted in the bore of a guide member, it becomes unnecessary, unlike the case of the conventional method, to finish the outer surface of the piston by grinding after the securing process of the partition member.

In addition, since the deformed rim portion remains generally cylindrical and consequently enhances the overall rigidity of the partition member itself, the partition member may be formed from a thin plate.

1 Claim, 5 Drawing Sheets

METHOD OF PARTITIONING THE INTERNAL SPACE OF A HOLLOW CYLINDRICAL MEMBER

BACKGROUND OF THE INVENTION

1. Field of the Invention

The present invention relates to a method of partitioning the internal space of a hollow cylindrical member, and more specifically, to a method of partitioning the internal space of a thin-walled cylindrical member by securing a thin-walled partition member in place within the cylindrical member by means of caulking.

2. Description of Related Art

A conventional method of partitioning will be described reference to FIG. 1.

A thin-walled cylindrical member 1 is formed therein with a space portion of larger diameter 2 and a space portion of smaller diameter 3. A shoulder face 5 is formed between the two portions 2 and 3. The portion of larger diameter 2 is formed at its end adjacent to the portion of smaller diameter 3 with an annular groove 4.

A partition member 17 in the form of a circular plate having a diameter substantially identical with that of the portion of larger diameter 2 is inserted into the cylindrical member 1 to rest on the shoulder face 5. A ring member 18 having an outside diameter substantially identical with the diameter of the portion of larger diameter 2 is placed on the partition member 17.

The ring member 18 is pressed against the shoulder face 5 to deform so that a portion of the ring 18 penetrates into the annular space formed between the circumferential face of the partition member 17 and that of the annular groove 4. The remaining portion of the ring member 18 is deformed on the periphery of partition member 17. In other words, the ring member 18 has to be crushed to tightly secure the partition member 17 on the shoulder face 5 and consequently to the cylindrical member 1. The internal space of the thin-walled cylindrical member 1 is thus partitioned into two chambers, the space portion of larger diameter 2 and the space portion of smaller diameter 3.

In partitioning internal space of a thin-walled cylindrical member by the conventional method as described above, a force of substantial magnitude has to be applied to the ring member and consequently to the partition member in order to tightly secure the partition member in place within the cylindrical member. In particular, if such a cylindrical member serves as a piston or cylinder which is subject to fluctuations in pressure and application of accelaration, a sufficient mechanical strength of the secured portion and a sufficient thickness of the partition member have to be insured. Accordingly, the weight of the partition member increases so that the operating speed of the piston is limited to a relatively low speed.

If greater force is applied to the ring member and partition member to provide the secured portion with greater mechanical strength, the cylindrical member, particularly the outer surface thereof, will be more deformed under the action of the force applied. In case that the cylindrical member serves as a piston which is slidably mounted within a guide member and, accordingly, high precision is required with respect to its outside diameter dimension, the outer surface of the piston has to be finished by grinding to compensate for the effect of the deformation generated during the process of securing the partition member. Such an additional grinding process causes a significant rise in the manufacturing cost.

SUMMARY OF THE INVENTION

Accordingly, it is an object of the invention to eliminate the above-mentioned disadvantages and provide a method of partitioning the internal space of a hollow cylindrical member by tightly securing a lightweight or thin walled partition member by means of calking without substantially deforming the outer surface of the cylindrical member.

The above and other objects of the present invention can be achieved by a method of partitioning the internal space of a hollow cylindrical member, which comprises the steps of: inserting a circular partition member into the hollow cylindrical member, the partition member having a circular plate portion and a rim portion axially extending from one side of the periphery of the circular plate portion, the hollow cylindrical member being formed therein with a space portion of larger diameter and a space portion of smaller diameter, the portion of larger diameter being formed at its end adjacent to the portion of smaller diameter with an annular groove; placing the partition member on a shoulder face formed between the two space portions so that the circular plate portion comes in contact with the shoulder face; and applying an axial force to the end face of the rim portion of the partition member to cause the rim portion to deform so that a portion of the rim portion penetrates into the annular groove, the partition member being thereby tightly secured by means of caulking to the annular groove and consequently to the hollow cylindrical member.

Accordingly, the rim portion of the partition member can be tightly secured in place within the cylindrical member without applying a substantial radial force to the wall of the cylindrical member and, accordingly, the cylindrical member, particularly the outer surface thereof, will be subject to little deformation during the securing process of the partition member. Therefore, in case that the cylindrical member serves as a piston which has to be slidably mounted in the bore of a guide member, it becomes unnecessary, unlike the case of the conventional method, to finish the outer surface of the piston by grinding after the securing process of the partition member.

In addition, since the deformed rim portion remains generally cylindrical and consequently enhances the overall rigidity of the partition member itself, the partition member may be formed from a thin plate.

In another aspect of the invention, there is provided a method of partitioning the internal space of a hollow cylindrical member comprising the steps of: inserting an annular partition member into the hollow cylindrical member, the partition member having an annular plate portion and inner and outer rim portions axially extending respectively from one side of the outer periphery of the annular plate portion and from the same side of the inner periphery of the annular plate portion, the hollow cylindrical member including an outer cylindrical portion and an inner cylindrical portion located coaxially with the outer cylindrical portion, the hollow cylindrical member further being formed therein with an annular space portion of larger width and an annular space portion of smaller width, the portion of larger width being formed at its end adjacent to the portion of smaller width with outer and inner annular grooves; bridging the partition member over outer and inner shoulder faces respectively formed between the two space portions so that the inner and outer peripheries of the annular plate portion come in contact with the shoulder faces; and applying an axial force to the end face of each of the inner and outer rim portions of the partition member to cause the rim portions to deform so that a portion of each of the rim portions penetrates into the corresponding annular groove, the partition member being thereby tightly secured by means of calking to the annular grooves and consequently to the hollow cylindrical member.

Accordingly, the rim portions of the annualr partition member can be tightly secured in place between the outer and inner cylindrical portions without applying a substantial radial force thereto and, accordingly, the two cylindrical portions, particularly the outer surface of the outer cylindrical portion will be subject to little deformation during the securing process of the partition member. Therefore, in case that such a hollow cylindrical member serves as a conventional hydraulic valve lash adjuster which includes outer and inner cylindrical portions and which has to be slidably mounted in the bore of a cylinder head, it becomes unnecessary to finish the outer surface of the piston by grinding after the securing process of the partition member.

In addition, since there is no way for particles produced by the grinding from entering into an oil-introducing chamber after securing the partition member, it becomes unnecessary, unlike the case of the conventional method, to remove the particles from the chamber.

The above and other objects, features and advantages of the present invention will become apparent from the following detailed description of preferred embodiments of the present invention with reference to the accompanying drawings.

DESCRIPTION OF THE PREFERRED EMBODIMENTS

Figure 1:
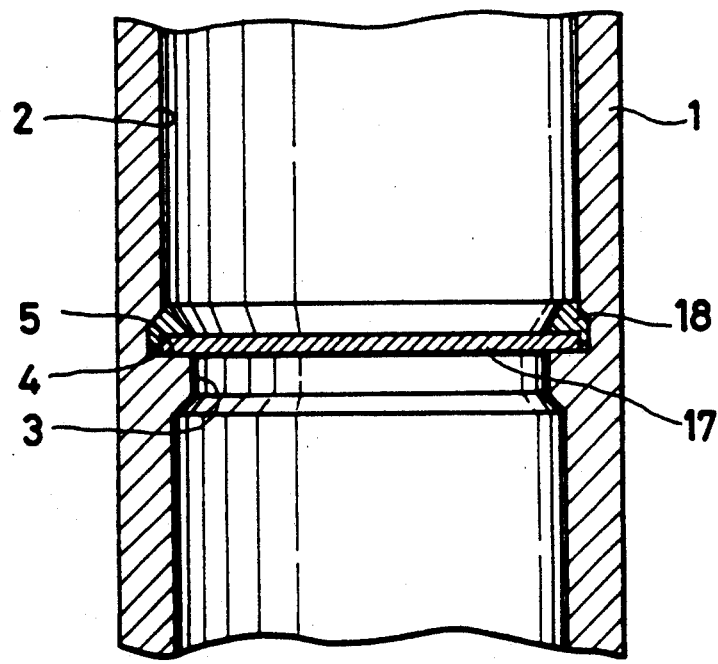
FIG. 1 is a cross sectional view illustrating a conventional method of partitioning the internal space of a hollow cylindrical member.
Figure 2:
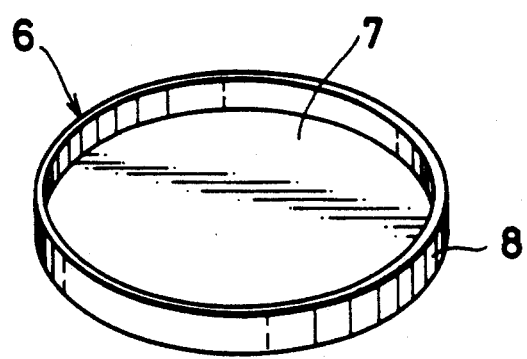
FIG. 2 is a perspective view showing the construction of a partition member which is formed by pressing from a circular thin plate and which is advantageously used in carrying out the method in accordance with the invention.
Figure 3:
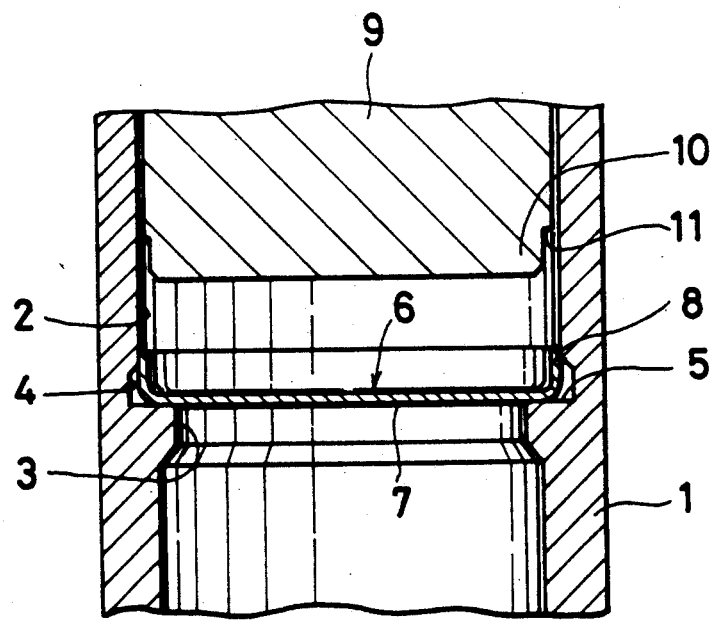
FIG. 3 is a cross sectional view showing a hollow cylindrical member within which the partition member shown in FIG. 2 is placed for subsequent application of the method in accordance with the invention.
Figure 4:
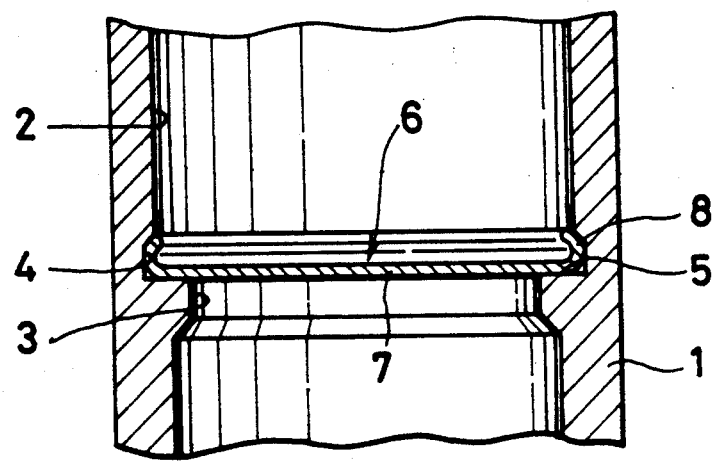
FIG. 4 is a cross sectional view, similar to the FIG. 3, showing the cylindrical member within which the partition member is secured by the method in accordance with the invention.

Referring to FIG. 2, there is shown a partition member 6 which is advantageously used in carrying out the method of the invention. Referring further to FIGS. 3 and 4, there is shown a hollow cylindrical member 1 of which the internal space is partitioned by the method of the invention. Components similar to those of the cylindrical member shown in FIG. 1 are given the same reference numerals as in FIG. 1.

The cylindrical member 1 is formed therein with a space portion of larger diameter 2 and a space portion of smaller diameter 3. An annular shoulder face 5 is formed between the two portions 2 and 3. The portion of larger diameter 2 is formed at its end adjacent to the portion of smaller diameter 3 with an annular groove 4.

The partition member 6 includes a circular plate portion 7 having a diameter substantially identical to the outside diameter of the portion of larger diameter 2, and a rim portion 8 axially extending from one side of the periphery of the circular plate portion 7. The partition member 6 may be formed by pressing from a thin plate.

As shown in FIG. 3, the partition member 6 is inserted into the cylindrical member 1 so that the circular plate portion 7 is placed in contact with the shoulder face 5 of the portion of smaller diameter 3. A pushrod 9 having an outside diameter slightly smaller than the diameter of the portion of larger diameter 2 is inserted down into the cylindrical member 1 to press the rim portion 8 for tightly securing the partition member 6 within the cylindrical member 1.

More specifically, the pushrod 9 is formed at its forward end with a press portion 10. The press portion 10 has an outside diameter slightly smaller than the inside diameter of the rim portion 8 and has a length shorter than the height of the rim portion 8 measured from the upper surface of the circular plate portion 7. Thus, when the pushrod 9 is inserted further into the cylindrical member 1, a shoulder face 11 comes into contact with the end face of the rim portion 8 to apply a downward force thereto.

With a further insertion of the pushrod 9 into the cylindrical member 1, the rim portion 8 is further pressed between the shoulder faces 5 and 11 to buckle and deform so that a portion thereof penetrates into the groove 4. FIG. 4 shows the cylindrical member 1 within which the partition member 6 is tightly secured by means of calking. As shown in the figure, the rim portion 8 of the partition member 6 is deformed and a portion thereof penetrates into the groove 4. However, the rim portion 8 remains generally cylindrical.

In accordance with the method described above, the rim portion of the partition member can be deformed and tightly secured in place within the cylindrical member without applying a substantial radial force to the wall of the cylindrical member and, accordingly, the cylindrical member, particularly the outer surface thereof, will be subject to little deformation during the securing process of the partition member. In addition, since the deformed rim portion 8 remains generally cylindrical and consequently enhances the overall rigidity of the partition member itself, the partition member may be formed from a thin plate.

Figure 5:
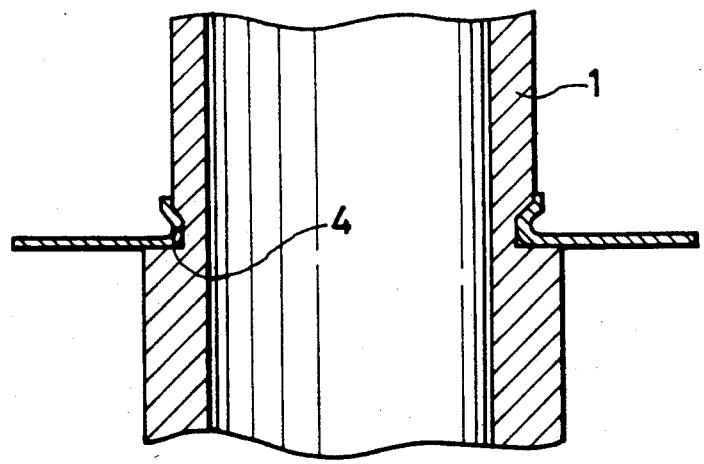
FIG. 5 is a cross sectional view illustrating an embodiment in which the method in accordance with the invention is applied to a hollow cylindrical member which is formed on the outer surface with an annular groove.

In FIG. 5, there is shown an embodiment in which the method of the invention is applied to a hollow cylindrical member 1 which is formed on the outer surface with an annular groove 4. It will become clear from the following embodiment that the same method as described above can be simply applied to such kind of cylindrical member.

Figure 6:
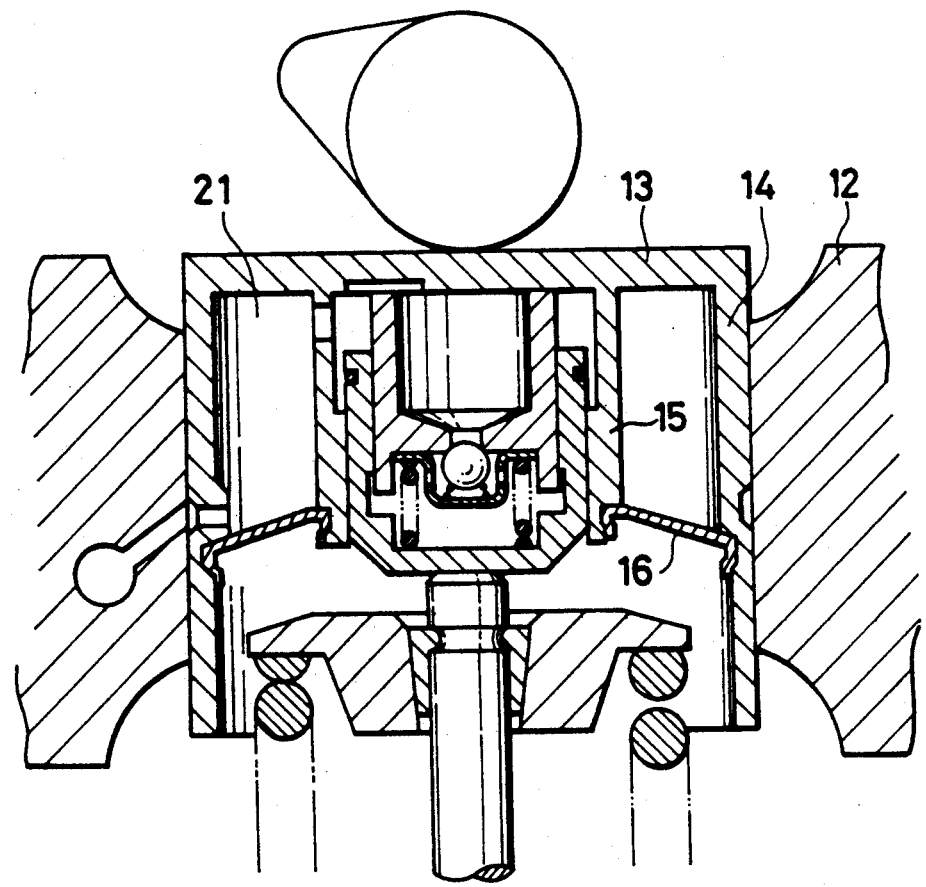
FIG. 6 is a cross sectional view illustrating another embodiment in which the method in accordance with the invention is applied to a conventional hydraulic valve lash adjuster.
Figure 9:
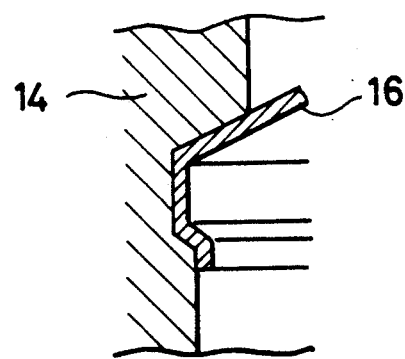
FIGS. 9 to 11 are enlarged cross sectional views respectively showing the secured portions of the partition members shown in FIGS. 6 to 8.

In FIG. 6, there is shown another embodiment in which the method of the invention is applied to a conventional hydraulic valve lash adjuster. In this embodiment, a body 13 includes two hollow cylindrical portions, an outer cylindrical portion 14 and an inner cylindrical portion 15. According to the method of the invention, a partition member or lid member 16 in the form of an annular thin plate is secured by means of calking between the inner wall of the outer cylindrical portion 14 and the outer wall of the inner cylindrical portion 15, the secured portion being best shown in FIG. 9.

If the partition member 16 is secured by the conventional method as described above, the outer cylindrical portion 14 and consequently the outer surface thereof is substantially deformed under the action of the force applied. Furthermore, since the outer cylindrical portion 14 has to be slidably mounted within the bore formed in a cylinder head 12, it becomes necessary to finish the outer surface of the outer cylindrical portion 14 by grinding to compensate for the effect of the deformation. This grinding process causes a further problem in that the resulting particles enter into an oil-introducing chamber 21 and moreover it is quite difficult to remove the particles therefrom.

In accordance with the method of the invention, the outer cylindrical portion, particularly the outer surface thereof, is not substantially deformed under the operation of securing the partition member. Therefore, it becomes unnecessary to finish the outer surface of the outer cylindrical portion by grinding after the securing the partition member or to remove particles from the oil-introducing chamber.

Figure 7:
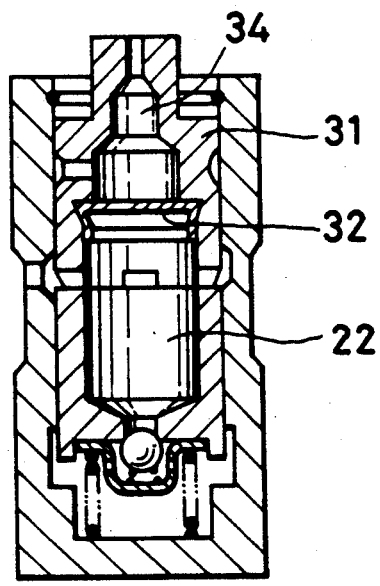
FIG. 7 is a cross sectional view illustrating a further embodiment in which the method in accordance with the invention is applied to another conventional hydraulic valve lash adjuster.
Figure 10:
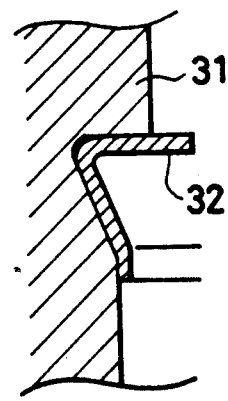

In FIG. 7, there is shown a further embodiment in which the method of the invention is applied to a conventional hydraulic valve lash adjuster. In this embodiment, the internal space of a plunger head 31 generally in the form of a cylinder is partitioned in accordance with the method of the invention. A partition member or lid member 32 partitions the internal space of the plunger head 31 into two chambers, a reservoir 22 and a lubricating passage 34. The partition member 32 is tightly secured to the plunger head 31 by means of caulking, the secured portion being best shown in FIG. 10.

Figure 8:
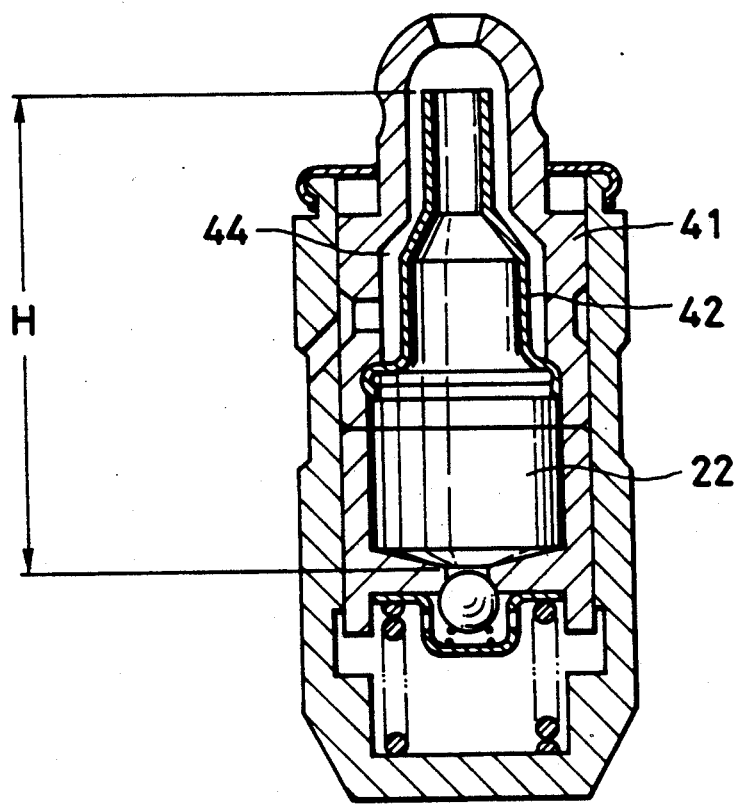
FIG. 8 is a cross sectional view illustrating a still further embodiment in which the method in accordance with the invention is applied to a further conventional hydraulic valve lash adjuster.
Figure 11:
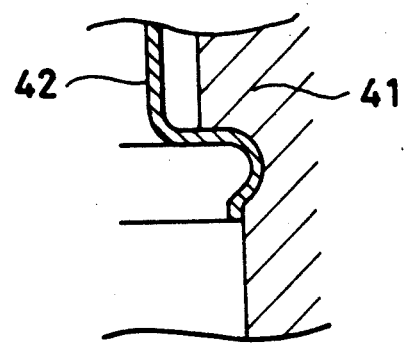

In FIG. 8, there is shown a still further embodiment in which the method of the invention is applied to a conventional hydraulic valve lash adjuster. In this embodiment, the internal space of a plunger head 41 is partitioned by a partition member 42 generally in the form of a cylinder member in accordance with the method of the invention. The internal space of the plunger head 41 is partitioned into two chambers, a reservoir 22 and an oil-introducing chamber 44 which is defined by the outer wall surface of the partition member 42 and the inner wall surface of the plunger head 41. The partition member 42 is secured to the plunger head 41 by means of calking in accordance with the method of the invention, the secured portion being best shown in FIG. 11.

With the partition member 42, the height H of the reservoir 22 and consequently volume thereof becomes larger. It, therefore, becomes possible to reserve sufficient oil in the reservoir 22 in case that the valve lash adjuster has to be installed with a certain degree of inclination.

Although the invention thus has been shown and described with reference to specific embodiments, it should be noted that the present invention is in no way limited to the details of the illustrated structures but changes and modifications may be made within the scope of the appended claims.

We claim:

1. A method of partitioning the internal space of a hollow cylindrical member, which comprises the steps of:

inserting a single circular partition member into the hollow cylindrical member, the partition member having a circular plate portion and a rim portion integrally formed with the circular plate portion so as to define a unitary partition member and axially extending from one side of the periphery of the circular plate portion, the hollow cylindrical member being formed therein with a space portion of larger diameter and a space portion of smaller diameter, the portion of larger diameter being formed at its end adjacent to the portion of smaller diameter with an annular groove;

placing the partition member on a shoulder face formed between the two space portions so that the circular plate portion comes in contact with the shoulder face; and applying an axial force to an end face of the rim portion of the partition member thereby causing the rim portion to deform so that a portion of the rim portion penetrates into the annular groove, the partition member being thereby tightly secured to the annular groove and consequently to the hollow cylindrical member.

* * * * *